United States Patent
Greenspan et al.

(12)

(10) Patent No.: US 6,362,782 B1
(45) Date of Patent: Mar. 26, 2002

(54) MULTIPATH PROPAGATION DETECTION AND AVOIDANCE METHOD AND SYSTEM

(75) Inventors: Richard L. Greenspan, Newton; Frank E. Mullen, North Easton, both of MA (US)

(73) Assignee: The Charles Stark Draper Laboratories, Inc., Cambridge, MA (US)

(*) Notice: Subject to any disclaimer, the term of this patent is extended or adjusted under 35 U.S.C. 154(b) by 0 days.

(21) Appl. No.: 09/552,501

(22) Filed: Apr. 19, 2000

(51) Int. Cl.[7] ................................................. G01S 3/02
(52) U.S. Cl. ........................ 342/453; 455/65; 455/506
(58) Field of Search ......................... 342/453; 348/614; 455/506, 65

(56) References Cited

U.S. PATENT DOCUMENTS 5,604,806 A * 2/1997 Hassan et al. ............... 380/44
5,847,678 A * 12/1998 Tachita ........................ 375/208
6,101,176 A * 8/2000 Honkasalo et al. .......... 370/335

* cited by examiner

Primary Examiner—Theodore M. Blum
(74) Attorney, Agent, or Firm—Iandiorio & Teska

(57) ABSTRACT

Multipath propagation detection can be accomplished using first and second spaced antennas which receive a carrier signal from a moving radiation source and produce a carrier phase difference representative of the location of the source; a difference signal representative of the difference between the measured carrier phase difference and a predetermined phase difference for the source in that location is generated; and the presence of multipath distortion in that difference signal is determined. Furthermore, when a multiplicity of source signals are tracked as in reception of navigation signals from the Global Positioning Satellite System, the receiver may be programmed to eliminate or suppress errors arising from measurements that have been distorted by multipath propagation.

11 Claims, 6 Drawing Sheets

MULTIPATH PROPAGATION DETECTION AND AVOIDANCE METHOD AND SYSTEM

FIELD OF INVENTION

This invention relates to a multipath detection and avoidance method and system, and more particularly to such a method and system for identifying multipath errors from a moving radiation source such as a GPS satellite and eliminating their effect on the performance of the receiver.

BACKGROUND OF INVENTION

The global positioning system (GPS) employs a GPS receiver responsive to the signals from a number of GPS satellites to determine the position of the receiver which may be borne by a person, airplane, missile, boat, car or other object. In more advanced applications the GPS may be used to determine not just the position but the attitude (e.g., the spatial orientation) of an object. For example, satellite carrier phase measurements from a plurality of antennas placed on the body, wings and tail, of an airplane can be processed by interferometric phase comparison to determine the roll, pitch and yaw of an airplane. However, attitude determination techniques have not achieved the accuracy predicted based solely on measurement noise considerations. The widely held belief is that multipath propagation is the cause of the shortfall. Normally in interferometric based attitude determination the signals from a satellite are sensed by two spaced antennas. The phase difference in the wavefronts arriving simultaneously at one and the other of the antennas encodes the angle between the antenna baseline and the line of sight from the antennas to the satellite. By applying this analysis to signals received from a number of satellites and combining them the position and attitude of the receiver and the antenna baseline may be determined. However, multipath propagation occurs when the signal from a satellite arrives at the antennas not just along a single direct path but also through one or more reflective paths so that multiple signals are received by the antennas thereby introducing errors in the position and attitude determinations.

SUMMARY OF INVENTION

It is therefore an object of this invention to provide a multipath detection method and a system to suppress the errors that this multipath can cause in the operation of the receiving system.

It is a further object of this invention to provide such a multipath detection method and suppression system for a global positioning satellite system receiver as well as for any communication navigation system that employs carrier phase modulation.

It is a further object of this invention to provide such a multipath detection method and system which identifies multipath error and corrects or removes it.

It is a further object of this invention to provide such a multipath detection method and system which can be used to map the position and attitude of reflecting surfaces that cause multipath.

The invention results from the realization that multipath distortion of signals from moving radiation sources such as GPS satellites can be detected by comparing the time history of the phase difference of a carrier signal from a moving source in a particular location as sensed by a pair of carrier phase interferometric antennas with the ideal or predetermined phase difference for a source in that location and analyzing any difference in those phase differences to detect the presence of a multipath error signal which can be eliminated or corrected or used to map the position of the reflector causing the multipath error.

This invention features a multipath error detection system including first and second spaced antennas for receiving a carrier signal from a moving radiation source and producing a carrier phase difference representative of the location of the source. There are means responsive to the carrier phase difference and to the predetermined phase difference for the source in that location for generating a difference signal representative of any difference in those phase differences. There are also means responsive to the difference signal for determining the presence of a multipath error signal. The technique can be extended in applicability and effectiveness to implementations in which there are more than one pair of antennas.

In a preferred embodiment there are means for removing the multipath error signal. The means for removing multipath may include means for eliminating the carrier signal containing the multipath error signal or may include means for correcting the multipath error signal in the carrier signal. The system may further include means for identifying the position of the reflector which generates the multipath error signal.

The invention also features a multipath error detection method including receiving from first and second spaced antennas a carrier signal from a moving radiation source and producing a carrier phase difference representative of the location of the source. There is generated a difference signal representative of any difference in the phase differences between the measured carrier phase difference and a predetermined phase difference for the source in that location. The presence of a multipath error signal in the difference signal is then determined.

In a preferred embodiment the method may further include removing the multipath error signal such as by eliminating it from the carrier signal or correcting the multipath error signal and the carrier signal. The method may further include identifying the position of the reflector which generates the multipath error signal.

DISCLOSURE OF PREFERRED EMBODIMENT

Other objects, features and advantages will occur to those skilled in the art from the following description of a preferred embodiment and the accompanying drawings, in which.

Figure 1:
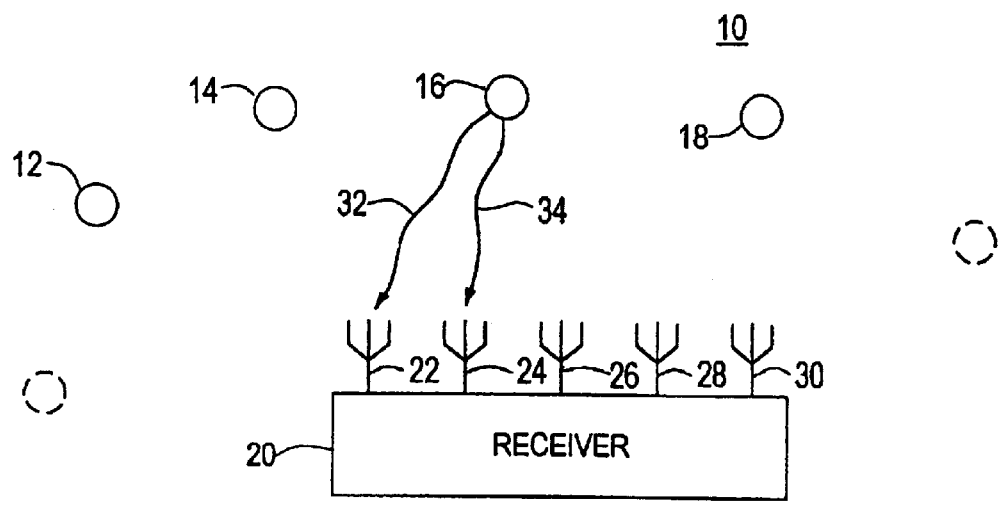
FIG. 1 is a schematic diagram of a GPS system which may use the multipath error detection method according to this invention.

There is shown in FIG. 1 a moving radiation source system 10 such as a GPS including a plurality of moving radiation sources, satellites 12, 14, 16 and 18 and a GPS receiver 20 which includes a plurality of antennas 22, 24, 26, 28 and 30 which receive the radiation from the satellites such as the carrier signal 32, 34 received by antennas 22 and 24.

Figure 2:
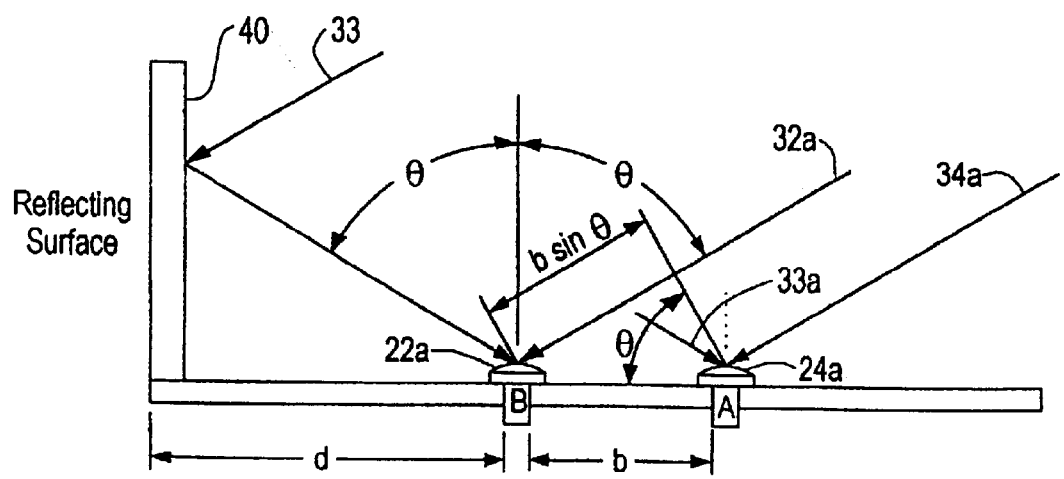
FIG. 2 is a schematic ray diagram showing the conditions which cause multipath error.

Under normal conditions radiation from a signal source 32a, 34a, FIG. 2, would strike antennas 22a and 24a at an angle θ causing a phase difference $$\frac{2\pi}{\lambda}b\sin\theta$$

radians where b is the distance between the antennas and λ is the wavelength of the radiation. This phase difference is indicative of the angle at which the rays 32a and 34a, which represent propagation paths of points of the radiation wavefront, are striking the antennas 22a and 24a and may be used in a well-known fashion to determine the line of sight angle to the satellite broadcasting these two carrier signals 32a and 34a. However, in the presence of a reflecting surface 40 another ray 33 emitted from satellite 16 with rays 32a and 34a will not strike antenna 22a over a direct path but does so only after first being reflected from surface 40. A similar reflection 33a strikes antenna 24a. These multipath reflections interfere with the direct signals 32a and 34a and cause a multipath error that detracts from the reliability and accuracy of the positioning and attitude information obtained.

Figure 3:
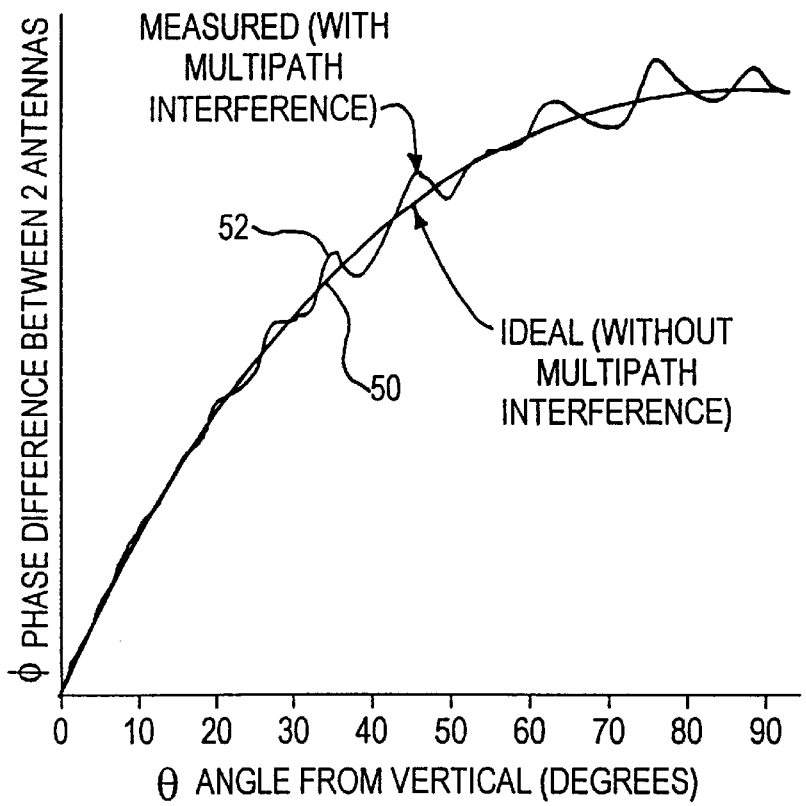
FIG. 3 illustrates the variation of phase difference between the two antennas with respect to the angle of incoming radiation ideally and with multipath error or interference.
Figure 4:
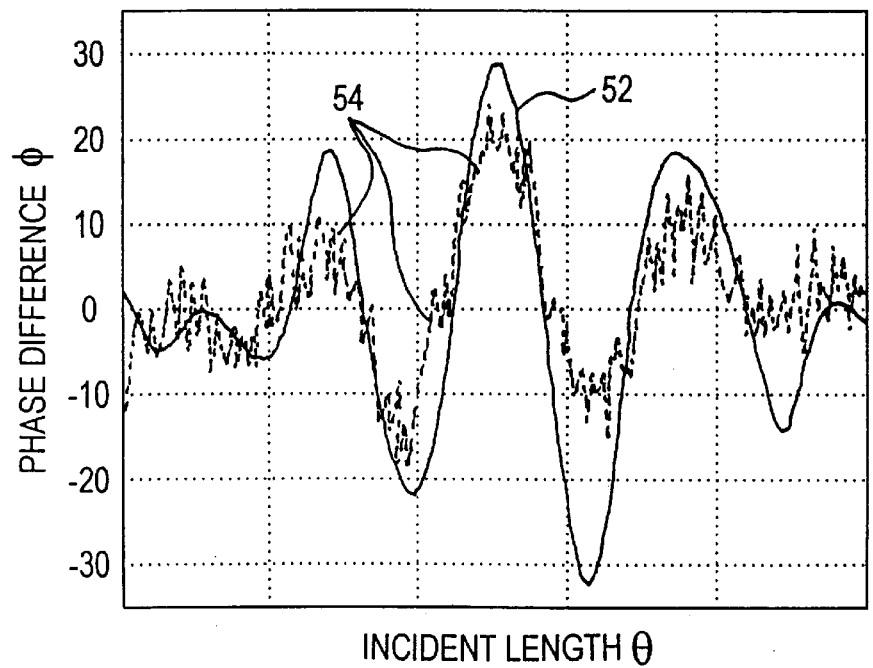
FIG. 4 is an enlarged detail view of a computed multipath error signature superimposed on the multipath error data.

Ideally the phase angle φ, FIG. 3, varies smoothly with the incident angle θ as indicated by the idealized characteristic curve 50. However, in the presence of multipath interference the characteristic takes on the form of the multipath error signature 52. This multipath error signature 52, shown enlarged in FIG. 4, is derived from a collection of data points 54 which are recognizable through the application of a multipath signature correlation.

Figure 6:
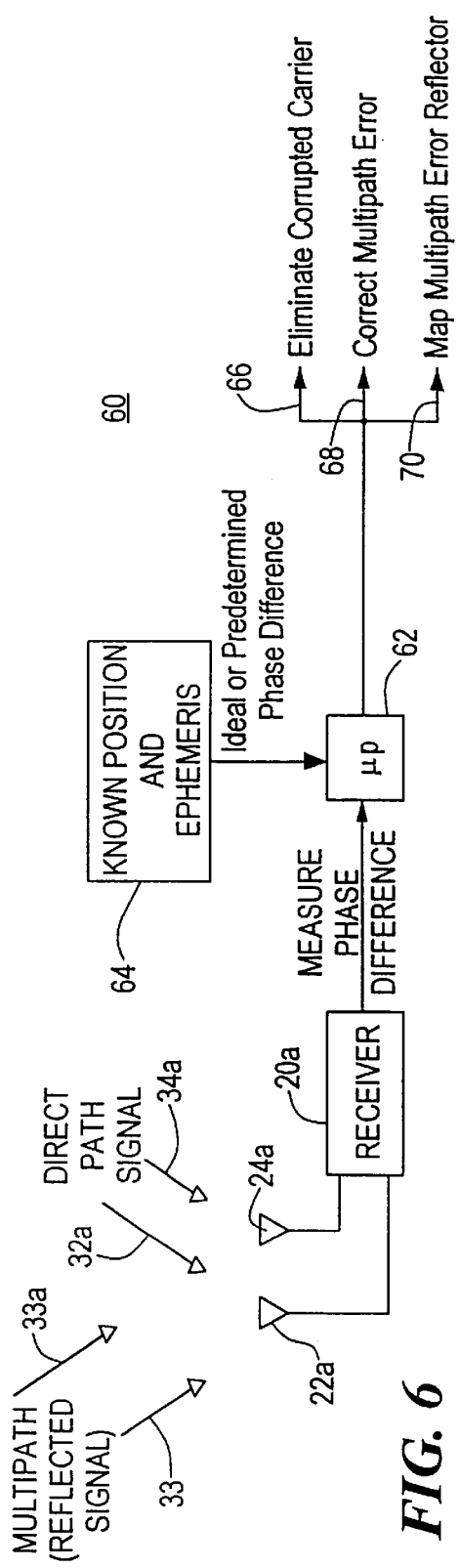
FIG. 6 is a schematic block diagram of a multipath error detection system according to this invention used in a GPS environment.

This is accomplished in a multipath error detection system 60, FIG. 6, wherein the GPS receiver 20a provides the measured phase difference to microprocessor 62. The measured phase difference represents the line of sight and thus the position of the satellite at a particular point in time. Microprocessor 62 also receives from circuit 64 the ephemeris or a set of parameters broadcast from the GPS satellite, from which it computes the satellite's actual position as a function of time. By the user also knowing his own position via standard GPS navigation, one can compute the satellite's position relative to the receiver's position from which is derived the angles required to determine the phase difference computations. That is, from the ephemeris there is provided the ideal or a predetermined phase difference and from the receiver there is provided the measured phase difference.

Microprocessor 62 compares the two to determine if there is any difference between those phase differences. If there is, a difference signal is generated to which is applied a multipath signature correlation to determine if that difference represents a multipath error signature. If such a multipath error signature is detected then the output of microprocessor 62 may be used either to eliminate the use of measurements from the corrupted carrier entirely 66 or the multipath error can be corrected 68, or irrespective of the multipath error presence, the multipath error signature may be used to calculate or to map the multipath error reflector position 70, that is, the location of the reflector that is causing the multipath error signature.

In either approach the multipath error signature correlation is accomplished by computing the phase difference between two antennas, the second one displaced from the first by a vector b, the baseline. The electrical signal received by the first antenna is:

DIRECT WAVE    MULTIPATH WAVE    1

$$A_1 = \vec{m}\cdot\vec{E}_0 + \vec{m}\cdot(\vec{R}\vec{E}_0)e^{-i2(-\vec{k}\cdot\hat{n})(d)}$$

The electrical signal received by the second antenna is:

DIRECT WAVE    MULTIPATH WAVE    2

$$A_2 = \vec{m}\cdot\vec{E}_0 e^{-i(\vec{k}\cdot\vec{b})} + \vec{m}\cdot(\vec{R}_{\vec{E}_0})e^{-i[2(-\vec{k}\cdot\hat{n})(d+\hat{n}\cdot\vec{b})+\vec{k}\cdot\vec{b}]}$$

where:

$\vec{m}$ is a unit vector model of the antennas $A_1$ and $A_2$, e.g., for right-hand circularly polarized patch antennas common to GPS receivers, $$m = \frac{\hat{x} - i\hat{y}}{\sqrt{2}},$$

where $\hat{x}$ and $\hat{y}$ are unit vectors in the x- and y-directions.

$\vec{E}_0$ is a vector representative of the electric field from the radiation source (e.g., GPS satellites). For GPS satellites, this is computed from satellite ephemeris and known position of antenna #1.

e is the base of natural logarithms.

i is the unit imaginary number √−1.

$\vec{k}$ is the "wave number" of the incident radiation. A vector quantity, its magnitude is $$\frac{2\pi}{\lambda},$$

where λ is the wavelength of the radiation, and its direction is from the radiation source (e.g., GPS satellite) to antenna #1. For GPS, $\vec{k}$ is computed from satellite ephemeris and known positions of antenna #1.

$\vec{R}$ is a reflection matrix computed from the known location and orientation of a reflecting surface. In applications where the location and orientation of a reflector is to be found, this matrix is solved for as a best fit to data.

d is the distance of antenna #1 perpendicularly from the plane of the reflector.

$\hat{n}$ is a unit vector normal to the reflector pointing into the half space that contains antenna #1.

$\vec{b}$ is the baseline vector from antenna #1 to antenna #2.

Figure 5:
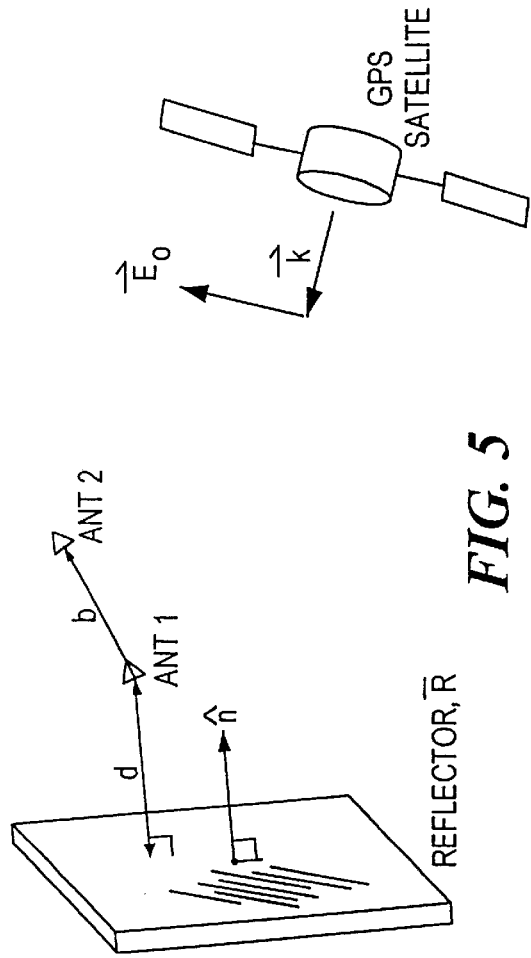
FIG. 5 is a schematic diagram showing the variables used in computing phase difference from the ephemeris and from determining the presence of a multipath error signal in the carrier signal.

FIG. 5 shows the reflector antennas and the satellite illustrating the various variables referred to.

Figure 7:
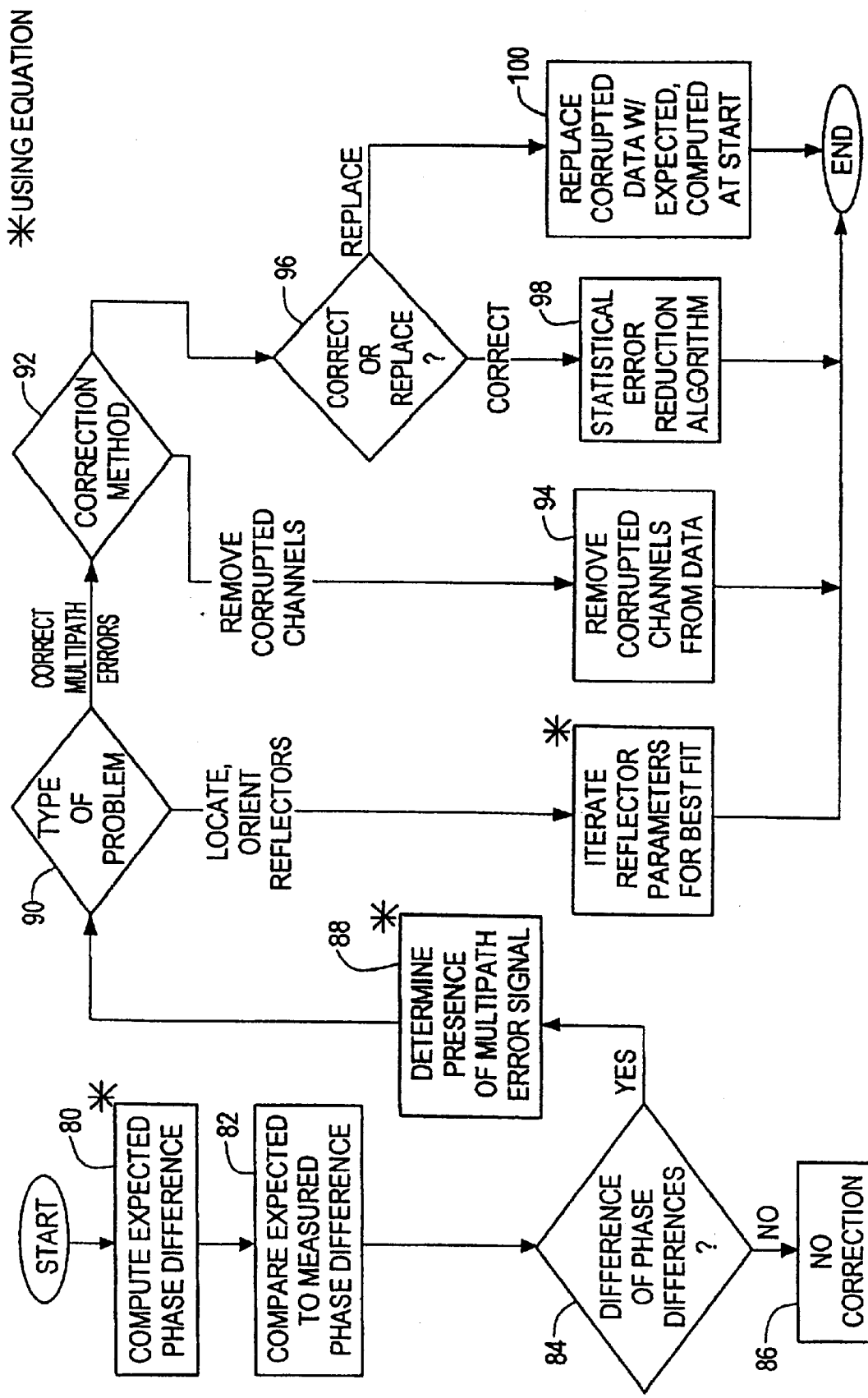
FIG. 7 is a flow chart of the software used in the microprocessor of claim 6 for identifying the multipath error.
Figure 8:
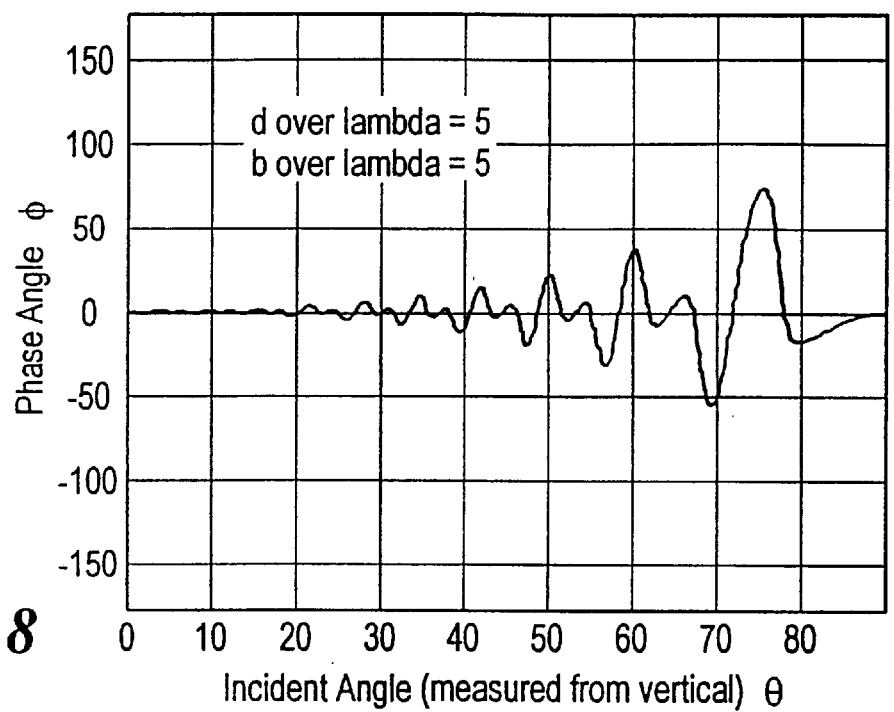
FIGS. 8, 9, 10 and 11 illustrate the variation in phase angle with respect to the incident angle as the multipath reflecting surface is moved farther from the antennas.

The actual phase difference in the presence of multipath is calculated by computing $A_1$ in the form $A_1 = e^{i\phi_1}$ and $A_2$ as $A_2=e^{i\Phi_2}$ so the difference in the phase difference is $\Delta\phi=\phi_2-\phi_1$. The equations for $A_1$ and $A_2$ are used by microprocessor 62 as shown by the flow chart in FIG. 7. First there is calculated the expected phase difference 80 using the direct wave portion of each of equations (1) and (2). Since this is the idealized phase difference coming from the ephemeris calculation the multipath wave portion of the equation drops out. Once that idealized phase difference has been calculated, that is compared 82 to the measured phase difference. A determination is then made as to whether there is a difference between those two phase differences 84. If there is not, no correction is needed 86. If there is, then that difference signal is examined to determine the presence of a multipath error signal. This is done again using the equations (1) and (2), but this time both the direct wave and multipath wave portions must be used since there is potentially apparently a multipath error signal present. Upon the determination of the presence of the multipath error signal 88, the use to which it will be put is determined by determining the type of problem 90 to be solved. If it is desired to correct errors then the correction method 92 is assumed which, for example, can simply remove the corrupted channels from the data. Typically in GPS systems a number of channels from a number of satellites are being looked at simultaneously, and if one of them is corrupted the data associated with that satellite or channel is simply deleted from the measurement matrix and is not used in the receiver calculations. Alternatively, it might be desired to correct or replace the multipath error signal 96. If it is desired to correct it, the carrier signal containing the multipath error signal can be submitted to a statistical estimation algorithm 98 such as least squares. Alternatively, the corrupted carrier signal with the multipath error signal can be replaced 100 with the idealized expected phase difference derived at step 80.

Figure 9:
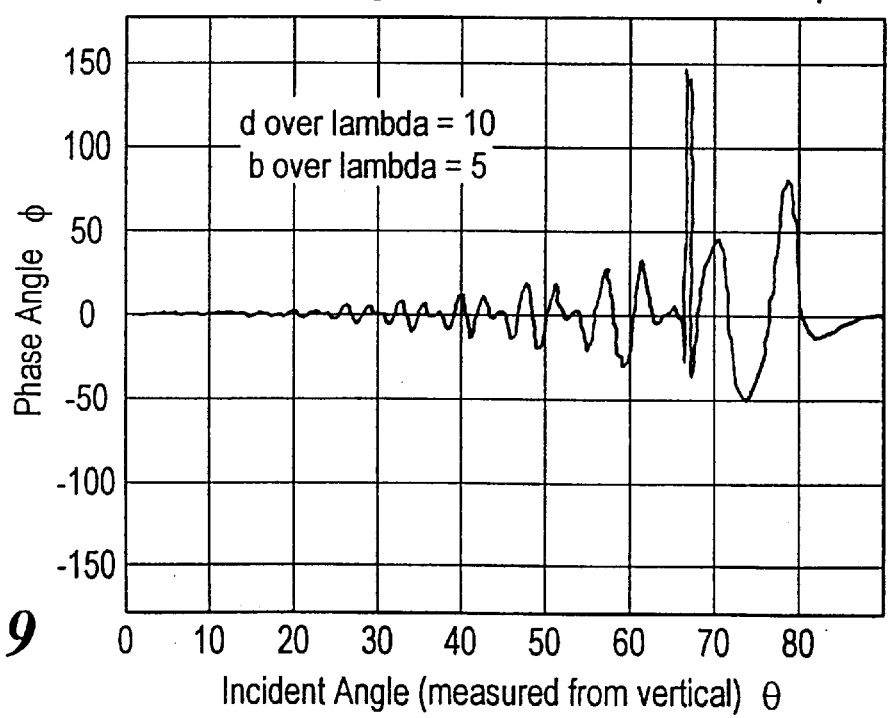
Figure 10:
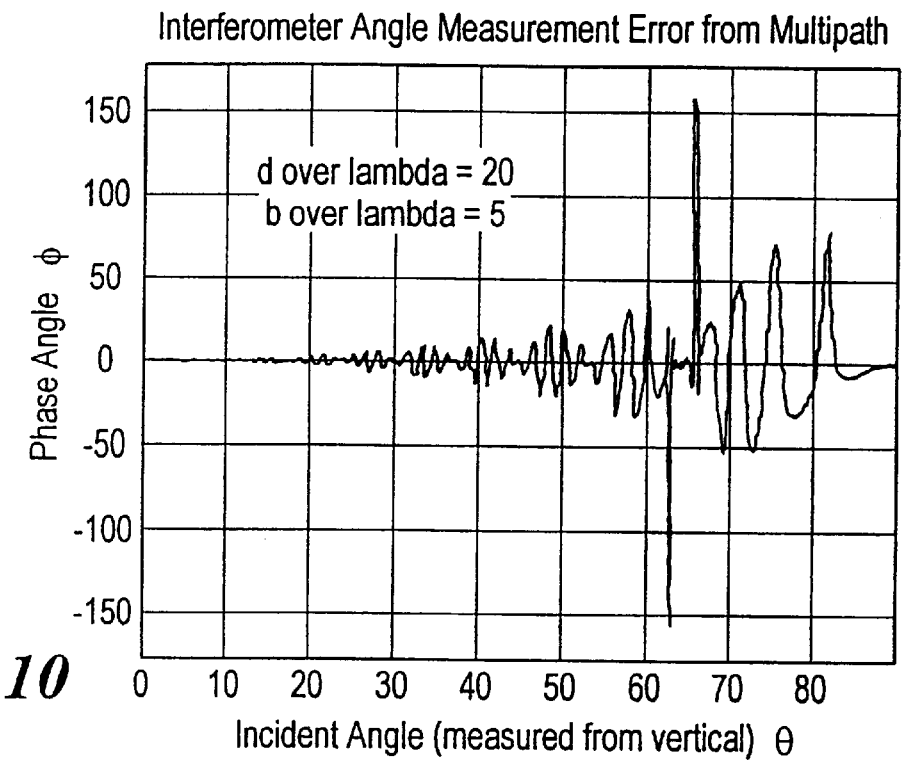
Figure 11:
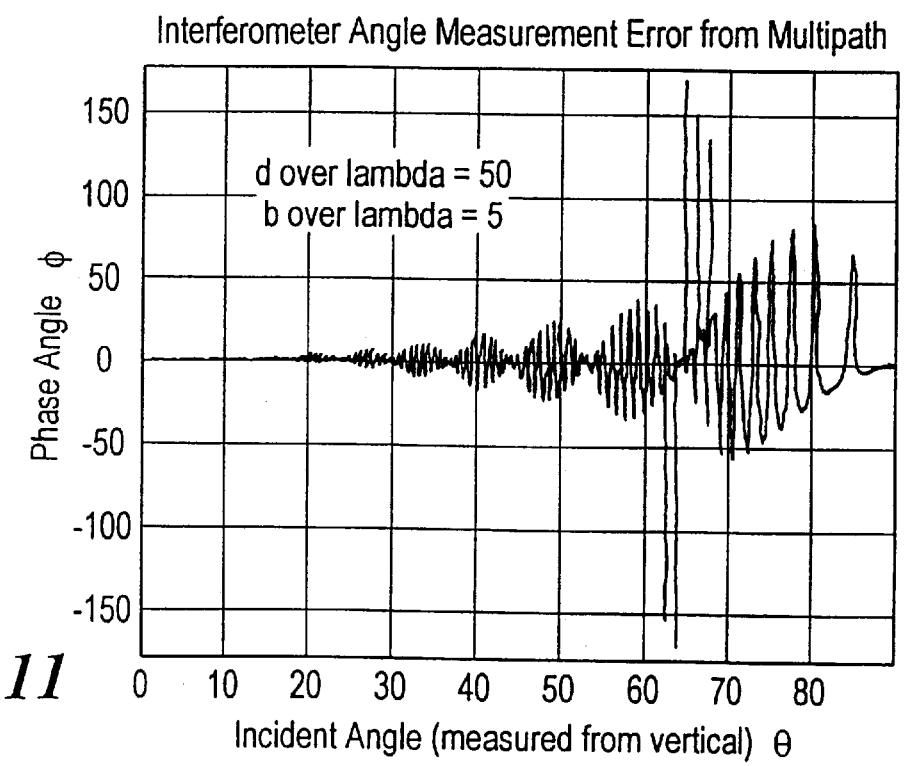

If error correction is not the aim, it may be desired to map the position of the reflector or reflectors causing the multipath error signals. This is done by calculating and recalculating the reflector parameters using the equations (1) and (2) to obtain the best fit to measured data. For example, assuming that the multipath error signal being obtained appears as that shown in FIG. 11, initially equations (1) and (2) may be solved where the values b and d, FIG. 2, are both equal to $5\lambda$. This is obviously not a good fit with the characteristics shown in FIG. 11. In that case the distance b between the antennas would be left at $5\lambda$ but the distance d from antenna 22a to reflector 40 may be increased from 5 to $10\lambda$ as shown in FIG. 9. This begins to look a little bit like the characteristic in FIG. 11. Thus the equations (1) and (2) would be solved again, this time with b equal to $5\lambda$ and d equal to $20\lambda$. Now the characteristic in FIG. 10 begins to look a lot more like that shown in FIG. 11. At this point if the value b is changed to $50\lambda$ and equations (1) and (2) solved again, a good fit would occur and the reflector causing the multipath error would have been mapped or located at a distance of 50 wavelengths from the antenna.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A multipath error detection system comprising:

first and second spaced antennas for receiving a carrier signal from a moving radiation source and producing a carrier phase difference representative of the location of the source;

means, responsive to said carrier phase difference and to a predetermined phase difference for the source in that location, for generating a difference signal; and means, responsive to said difference signal, for determining the presence of a multipath error signal.

2. The multipath error detection system of claim 1 further including means for removing the multipath error signal.

3. The multipath error detection system of claim 2 in which said means for removing includes means for eliminating the carrier signal containing the multipath error signal.

4. The multipath error detection system of claim 2 in which said means for removing includes means for correcting measurement errors caused by the multipath signal received in addition to a direct signal.

5. The multipath error detection system of claim 1 further including means for identifying the position of a reflector which generates the multipath error signal.

6. A multipath error detection method comprising:

receiving at first and second spaced antennas a carrier signal from a moving radiation source and producing a carrier phase difference representative of the location of the source;

generating a difference signal representative of a difference between the carrier phase difference and a predetermined phase difference for the source in that location; and determining the presence of a multipath error signal in the difference signal.

7. The multipath error detection method of claim 6 further including removing the multipath error signal.

8. The multipath error detection method of claim 7 in which removing includes eliminating the carrier signal containing the multipath error signal.

9. The multipath error detection method of claim 7 in which removing includes correcting the multipath error signal in the carrier signal.

10. The multipath error detection method of claim 6 firther including identifying the position of a reflector which generates the multipath error signal.

11. A multipath error detection system comprising:

first and second spaced antennas for receiving a carrier signal from a moving radiation source and producing a carrier phase difference representative of the location of the source; and a processor programmed to:
generate a difference signal based on said carrier phase difference and a predetermined phase difference for the source in that location;
determine the presence of a multipath error signal based on the difference signal; and
remove the multipath error signal.

* * * * *